April 10, 1934.  P. J. KULY  1,954,593
WEED DESTROYER
Filed March 12, 1932  2 Sheets-Sheet 1
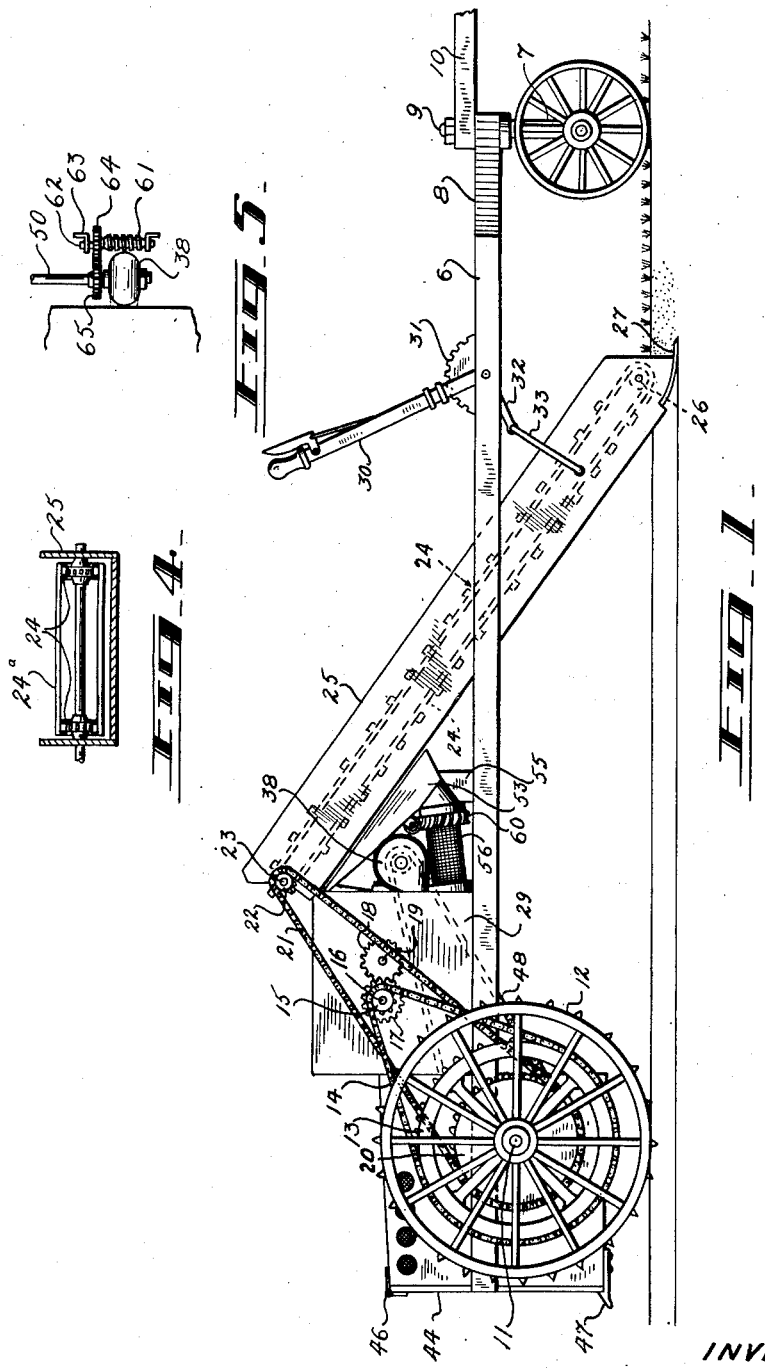
INVENTOR
Paul J Kuly
BY
ATTORNEY April 10, 1934.  P. J. KULY  1,954,593
WEED DESTROYER
Filed March 12, 1932  2 Sheets-Sheet 2
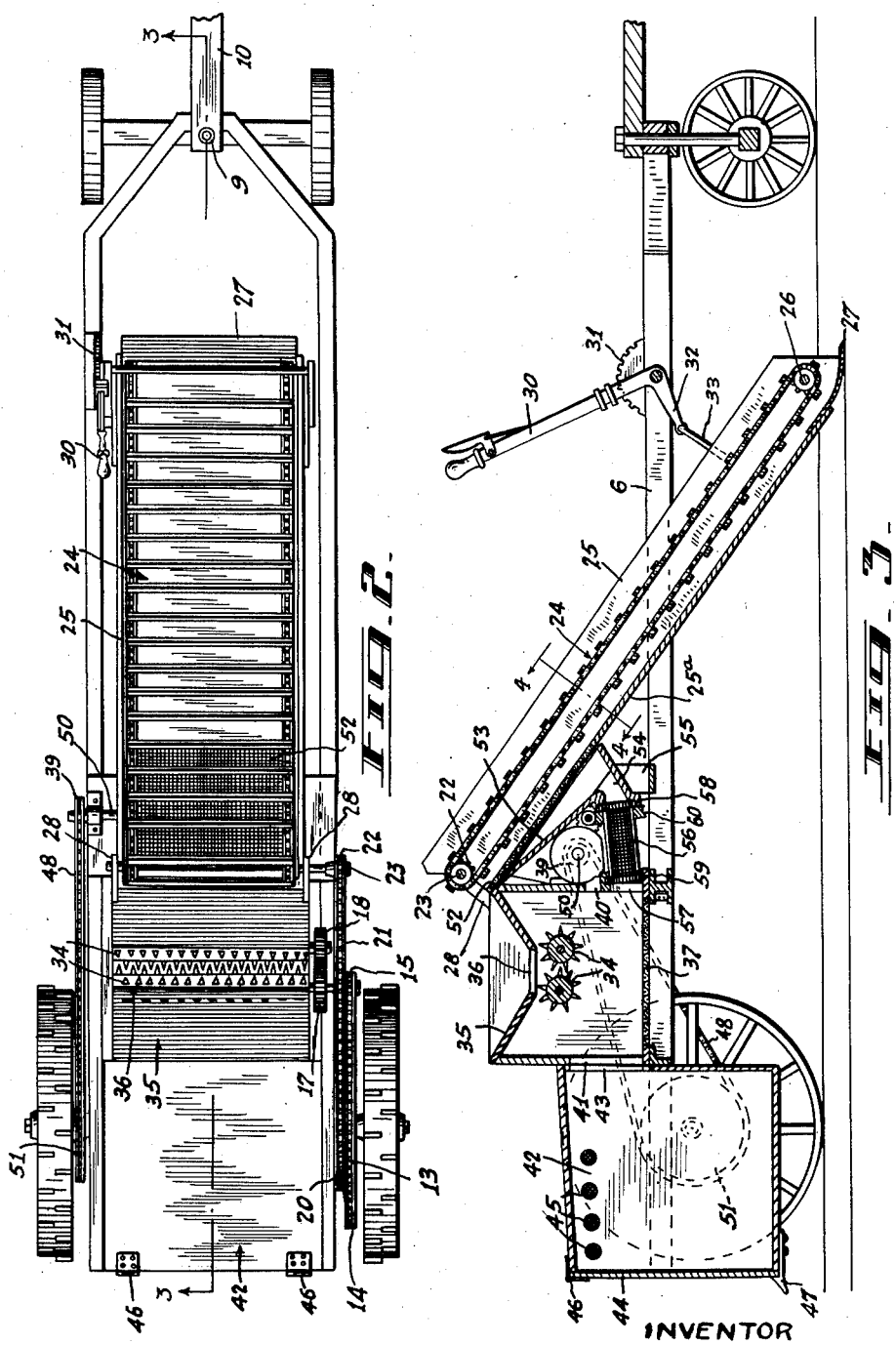
INVENTOR
PAUL J. KULY
BY
ATTORNEY Patented Apr. 10, 1934

1,954,593

UNITED STATES PATENT OFFICE 1,954,593

WEED DESTROYER

Paul J. Kuly, Mundare, Alberta, Canada

Application March 12, 1932, Serial No. 598,516

4 Claims. (Cl. 97—10)

This present invention relates to certain new and useful improvements in a weed destroyer.

The primary object of the invention resides in the provision of a weed destroyer which effectively gathers the weeds, separates them from the soil and at the same time grinds them and permits the separated soil to return to the ground.

The invention has for another object the provision of a weed destroyer of the character stated which effectively gathers the weeds from the ground and grinds the same with the dirt gathered with the weeds and permits return of the dirt to the ground after separating all portions of the weeds therefrom.

The invention has for a still further object the provision of a weed destroyer of the character stated which serves to gather the weeds with their roots from the ground, grinds them and separates them from the soil and sifts the soil back to the ground, retaining the weeds separated therefrom.

The invention has for a still further object the provision of a weed destroyer of the character stated which is of extremely simple and efficient operation as well as simple and inexpensive in construction and composed of the minimum number of parts.

The invention has for a still further object the provision of a weed destroyer of the character stated which may be manufactured at small cost and retailed at a popular price with good profit, thus providing a commercially attractive proposition.

To the accomplishment of these and related objects as shall become apparent as the description proceeds, my invention resides in the construction, combination and arrangement of parts as shall be hereinafter more fully described, illustrated in the accompanying drawings and pointed out in the claims hereunto appended.

The invention will be best understood and can be more clearly described when reference is had to the drawings forming a part of this disclosure, wherein like characters indicate like parts throughout the several views.

In the drawings:—

Figure 1 is a side elevation of the improved destroyer;

Figure 2 is a top plan view thereof;

Figure 3 is a longitudinal vertical section, taken substantially on the plane of line 3—3 of Figure 2, looking in the direction indicated by the arrows;

Figure 4 is a detail section, taken substantially on the plane of line 4—4 of Figure 3, looking in the direction indicated by the arrows; and Figure 5 is a fragmentary detail view of the driving mechanism for the blower fan and the rotary cylinder sieve.

Referring more in detail to the drawings, it is to be noted that the weed destroyer includes a main rectangular frame 6 having a forward truck 7 beneath its contracted forward end 8, and mounted on a king bolt 9, on which is also carried a draft tongue 10 or the like. This rectangular main frame 6 has a pair of stub shafts 11 extending from bearings carried on the sides thereof, adjacent the rear end of the main frame 6 to support the rear traction wheels 12 of the weed destroyer. A drive sprocket wheel 13 is carried on the inner side of one of the rear traction wheels 12 and has a sprocket chain 14 operating therearound which also operates around a small sprocket wheel 15 on a transverse shaft 16, to drive the latter. This transverse shaft 16 also has a gear wheel 17 mounted thereon meshing with a corresponding gear wheel 18 on a transverse shaft 19 which is parallel with the shaft 16. A small sprocket wheel 20 is also carried on the shaft 11 with a sprocket chain 21 operating therearound and which also operates around a small sprocket wheel 22 on the upper transverse shaft 23 of an endless elevator 24. The endless elevator 24 operates in a rearwardly inclined plane within an elevator frame 25, above the bottom 25a thereof, and works around a lower transverse elevator shaft 26 as well as the upper transverse elevator shaft 23, the shafts 23 and 26 being rotatably mounted in the upper and lower ends respectively of the elevator frame 25. The plough point 27, blade or the like is mounted on the lower end of the elevator frame bottom 25a and adapted to dig up weeds, roots and the like and deliver them on to the lower end of the said elevator frame bottom 25a as the weed destroyer moves forwardly over the ground. The upper transverse elevator shaft 23 is rotatable in upstanding bearings 28 provided on the forward upper edge of the grinder and pulverizer box 29 carried on the main frame 6, rearwardly of the endless elevator and the shaft 23 thus serves as a fulcrum member for the endless elevator frame 25 and endless elevator 24. The endless elevator 24 and its frame 25 may be readily adjusted and the lower end thereof raised and lowered by means of a conventional lever 30 fulcrumed at its lower end on the main frame 6 and adapted to be locked in adjusted position on a segmental rack 31 also carried on the main frame 6. The lever 30 has a rigid arm 32 extended therefrom at an angle and loosely connected with a ball 33 extended transversely across the endless elevator 25. It is thus apparent that when the lever 30 is operated over the segment 31, the lower end of the endless elevator 24 and its frame 25 will be raised and lowered to adjust the depth of operation of the plough point 27, blade or the like extending from the lower end of said elevator frame bottom 25a.

The parallel shafts 16 and 19 extend transversely through the grinder and pulverizer box 29 approximately at the centre thereof, and are rotatable in said box 29, the shafts 16 and 19 having rigid thereon within the box 29 complementary grinding and pulverizing rollers 34 with the teeth thereof arranged for intermeshing engagement as the shafts 16 and 19 are rotated toward one another during forward movement of the weed destroyer. This box 29 has a top 35 which slopes downwardly from the forward and rear edges thereof to the transverse slot 36 provided in the centre of the top 35, just above the intermeshing portions of the rollers 34, so as to deliver to said rollers 34 all weeds, roots and dirt brought up by the endless elevator 24 and delivered on to the top 35 of the box 29. This box 29 has a dirt sifting bottom 37 through which may readily pass the dirt ground and pulverized while passing between the rollers 34.

A blower fan 38 of conventional form is mounted on the forward side of the box 29 and the tangential discharge pipe 40 from the blower fan 38 is extended into the forward side of the box 29 at a point intermediate the horizontal planes occupied by the rollers 34 and the dirt sifting bottom 37 of the box 29. A weed and root discharge slot 41 is provided transversely in the lower portion of the rear side of the box 29, opposite the blower fan discharge pipe 40 so that all weeds, roots and the like dropping from between the rollers 34 are blown from the box 29, through the discharge slot 41 thereof and into a weed and root gathering box 42, suspended low in the rear end of the main frame 6, a transverse slot 43 in the upper portion of the forward side of the box 42 registering with the discharge slot 41 of the box 29. This weed and root gathering box 42 has a hinged rear side 44 and a plurality of screened air outlet openings 45 are also provided in the sides of the box 42, near the top thereof. The hinged rear side 44 of the box 42 is shown as being hinged to the stationary top of the box 42 by appropriate hinges 46, while a spring latch 47 is employed for normally holding the rear side 44 of the box 42 in closed position, the spring latch 47 being carried on the bottom of the box 42 and projecting rearwardly therefrom. For operating the blower fan 38, a sprocket chain 48 is employed and extended around a small sprocket wheel 39 carried on one extended end of the shaft 50 for the blower fan 38, the sprocket chain 48 also operating around a larger driving sprocket wheel 51 carried on the inner side of the other or remainnig rear traction wheel 12. Thus, the blower fan 38 is operated at the proper speed, as well as the grinding and pulverizing rollers 34 and the endless elevator 24, during forward movement of the weed destroyer over the ground. It may also be stated that the endless elevator 24 is shown as being of the endless belt type with transverse plates or steps 24a on its outer face to assure retaining of the weeds and roots on the upper face of the endless elevator frame bottom 25a during elevation thereof to the box 29.

In the upper end of the endless elevator frame bottom 25a, is a fine screening member 52 over which the sod or weeds and dirt must pass before reaching the grinder and pulverizer box 29. Fine grass, weeds and dirt will drop through the screening member 52 into the rearwardly inclined and upwardly tapering chute 53 located beneath said screening member 52 and having a rearwardly extended and downturned discharge spout 54 resting on the upstanding bracket support 55 for the chute 53 and carried on the main frame 6. The discharge spout 54 of the chute 53 delivers into the raised forward end of the rotary cylinder sieve 56 having its lower rear end discharging through the opening 57 in the forward wall of the grinder and pulverizer box 29, into the latter, just above the sifting bottom 37 thereof. The forward and rear ends of the rotary cylinder sieve 56 are respectively supported in a rotatable manner by journalling means 58 in the discharge spout 54 of the chute 53 and journalling means 59 provided at the wall of the opening 57 in the forward side of the grinder and pulverizer box 29. A worm wheel 60 is rigidly mounted on the exterior of the rotary cylinder sieve 56 circumferentially thereof and adjacent the raised forward end of said rotary cylinder sieve 56 and is engaged and driven by the worm drive gear 61 carried on a stub shaft 62 which has its opposite ends journalled in bracket bearings 63 appropriately secured to the underface of the chute 53 or some other suitable stationary portion of the device. The stub shaft 62 has a gear wheel 64 provided thereon which is engaged and driven by a gear wheel 65 on the lower crank shaft 50, thus assuring continual rotation of the rotary cylinder sieve 56 at a predetermined speed during operation of the blower fan 38, the shafts 16 and 19 carrying the grinding and pulverizing rollers 34 within the grinder and pulverizer box 29, and the endless elevator 24 as the device moves forwardly over the land being operated upon.

As the construction of the device has thus been described in detail, brief reference is now had to its use and modus operandi: As the weed destroyer moves forwardly over the ground, the plow point 27, blade or the like works below the surface and digs up all weeds, roots and the like and delivers the same with some soil onto the lower end of the endless conveyor frame bottom 25a, carrying the same upwardly over the solid portion of the said frame bottom 25a and the screening member 52, and deposits the weeds, roots and attached soil into the grinder and pulverizer box 29. All loosened soil and fine sod reaching the screening member 52, will readily pass therethrough, into the rearwardly inclined chute 53 and, by way of the latter to the rotary cylinder sieve 56, the finest of said soil and sod dropping through the rotary cylinder sieve 56, while the remainder continues through the rotary cylinder sieve 56 and into the grinder and pulverizer box 29. As the shafts 16 and 19 are constantly rotating toward one another, they tend to draw downwardly therebetween the weeds, roots and soil delivered into the top of the grinder and pulverizer box 29 thoroughly grinding and crushing the same and dropping it into the bottom of the box 29. The blower fan 38 working constantly causes a strong current of air to pass rearwardly through the lower portion of the box 29, thus separating the weeds and roots from the soil and throwing the weeds and roots into the weed and root gathering box 42, permitting the soil which is heavier to drop onto and pass through the screened or sifting bottom 37 of the box 29, back to the ground. The box 42 may be opened and the accumulation in the same removed therefrom, when desired. The screened openings 45 in the sides of the box 42 provide a ready escape for the current of air serving to bring the weeds and roots into the box 42, without danger of permitting escape of the weeds and roots. The endless elevator may be adjusted to the desired incline and the plow point 27, blade or the like carried thereby thus set to operate at the proper depth in the ground, by adjusting of the lever 30 over the segment 31. As all of the operating parts of the weed destroyer are driven and controlled from the rear traction wheels 12, proper operation of these parts at predetermined speed during forward movement of the weed destroyer over the ground is thus assured.

From the foregoing description taken in connection with the accompanying drawings, it will be manifest that a weed destroyer is provided that will fulfill all the necessary requirements of such a device but as many changes could be made in the above description and many apparently widely different embodiments of my invention may be constructed within the scope of the appended claims without departing from the spirit or scope thereof, it is intended that all matters contained in the said accompanying specification and drawings, shall be interpreted as illustrative and not in a limitative or restrictive sense.

Having thus described my invention, what I claim as new and desire to secure by Letters Patent is:

1. A weed destroyer including a main frame; a weed and root gathering box carried by said main frame; traction wheels for said main frame; a grinding and pulverizing means carried on said main frame; an enclosing box for said grinding and pulverizing means with a screen bottom having communication from the bottom of the rear thereof with the top of said weed and root gathering box; an endless elevator operating through said main frame; said endless elevator delivering to said grinding and pulverizing means; a weed and root gathering member supported by said endless elevator to gather weeds and roots and deliver the same to said endless elevator; means operating on said main frame to adjust the incline of the endless elevator and regulate the depth of operation of the weed and root gathering member; and means carried on said frame for blowing the weeds and roots from the grinding and pulverizing means into said weed and root gathering box, while the dirt separated from said weeds and roots returns to the ground.

2. A weed destroyer including a main frame; an endless elevator frame suspended in a rearwardly inclined plane through said main frame; an endless elevator operating in said elevator frame; a weed and root gathering member suspended from the lower end of said elevator frame and operating in the ground to gather weeds, roots and the like and deliver them to the lower end of said endless elevator frame; means operable on said main frame to adjust the incline of the elevator frame and endless elevator and regulate the depth of operation of the weed and root gathering member; a grinding and pulverizing mechanism; a box carried on said main frame and enclosing said grinding and pulverizing mechanism; a dirt sifting bottom for said box; a second box suspended in said main frame to receive weeds, roots and the like from the first mentioned box; said endless elevator serving to deliver the gathered weeds, roots and the like over said endless elevator frame to the first mentioned box; and a blower fan carried on said main frame to create a current of air through the lower portion of said first mentioned box and through the upper portion of said second mentioned box to blow from the first mentioned box into the said second mentioned box the weeds, roots and the like after passage of the same through the grinding and pulverizing mechanism in the first mentioned box and as the dirt separated from said weeds, roots and the like drops to the bottom of the first mentioned box to be sifted therethrough back to the ground.

3. A weed destroyer including a main frame; a weed and root gathering box carried by said main frame; traction wheels for said main frame; a grinding and pulverizing means carried on said main frame; an enclosing box for said grinding and pulverizing means with a screen bottom having communication from the bottom of the rear thereof with the top of said weed and root gathering box; an endless elevator operating through said main frame; said endless elevator delivering to said grinding and pulverizing means; a weed and root gathering member supported by the lower end of said endless elevator to gather weeds and roots and deliver the same to said endless elevator; means operating on said main frame to adjust the incline of the endless elevator and regulate the depth of operation of the weed and root gathering member; an additional communication from said endless elevator at the upper end thereof to said enclosing box and means carried on said frame for blowing the weeds and roots from the grinding and pulverizing means into said weed and root gathering box, while the dirt separated from said weeds and roots returns to the ground.

4. A weed destroyer including a main frame and endless elevator frame suspended in the rearwardly inclined plane through said main frame; an endless elevator operating in said elevator frame; a weed and root gathering member suspended from the lower end of said elevator frame and operating in the ground to gather weeds and the like and deliver them to the lower end of said endless elevator frame; means operable on said main frame to adjust the incline of the elevator frame and endless elevator and regulate the depth of operation of the weed and root gathering member; a grinding and pulverizing mechanism; a box carried on said main frame and enclosing said grinding and pulverizing mechanism; a funnel-like slotted top therefor; a dirt sifting bottom for said box; a second box suspended in said main frame to receive weeds, roots and the like from the first mentioned box; said endless elevator serving to deliver the gathered weeds, roots and the like over said endless elevator frame to the first mentioned box; a screen in the bottom of the elevator frame at the upper end thereof; a chute therefrom; a rotatable cylinder sieve from said chute to said grinding and pulverizing mechanism box; and a blower fan carried on said main frame to create a curtain of air through the lower portion of said first mentioned box.

PAUL J. KULY. [L. S.]